(12) United States Patent
Hamaguchi et al.

(10) Patent No.: US 8,369,240 B2
(45) Date of Patent: Feb. 5, 2013

(54) WIRELESS COMMUNICATION SYSTEM, BASE STATION APPARATUS, MOBILE STATION APPARATUS, AND COMMUNICATION METHOD

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/147,553

(22) PCT Filed: Jan. 12, 2010

(86) PCT No.: PCT/JP2010/050209
§ 371 (c)(1),
(2), (4) Date: Sep. 22, 2011

(87) PCT Pub. No.: WO2010/090052
PCT Pub. Date: Aug. 12, 2010

(65) Prior Publication Data
US 2012/0002602 A1    Jan. 5, 2012

(30) Foreign Application Priority Data
Feb. 3, 2009   (JP) .................... 2009-023036

(51) Int. Cl.
*H04L 12/56* (2006.01)
*H04J 1/16* (2006.01)
(52) U.S. Cl. .................. 370/252; 370/278; 370/334
(58) Field of Classification Search ........... 370/252, 370/278, 334
See application file for complete search history.

(56) References Cited

U.S. PATENT DOCUMENTS

| | | |
|---|---|---|
| 2004/0171359 A1 | 9/2004 | Tirkkonen et al. |
| 2009/0067355 A1 | 3/2009 | Haartsen et al. |
| 2009/0156227 A1* | 6/2009 | Frerking et al. ............ 455/455 |
| 2009/0190561 A1 | 7/2009 | Yokoyama |
| 2011/0243259 A1* | 10/2011 | Zeira et al. .................. 375/259 |

FOREIGN PATENT DOCUMENTS

| | | |
|---|---|---|
| JP | 7-87011 A | 3/1995 |
| JP | 2003-18053 A | 1/2003 |
| JP | 2006-513675 A | 4/2006 |
| WO | WO 2008/068803 A1 | 6/2008 |
| WO | WO 2009/034089 A1 | 3/2009 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 V8.5.0, (Dec. 2008), pp. 9-14.

* cited by examiner

*Primary Examiner* — John Pezzlo
(74) *Attorney, Agent, or Firm* — Birch, Stewart, Kolasch & Birch, LLP

(57) ABSTRACT

TPC is appropriately operated in response to access method switching timing, an error is prevented from occurring in communication, and influence given to another cell due to transmission of unnecessary power is reduced.

A base station apparatus which performs wireless communication with a mobile station apparatus while switching a plurality of kinds of communication method, transmits control information for performing transmit power control of the mobile station apparatus to the mobile station apparatus. The mobile station apparatus receives the control information for performing the transmit power control from the base station apparatus and determines a transmitted power according to the control information when switching the communication method.

18 Claims, 4 Drawing Sheets

WIRELESS COMMUNICATION SYSTEM, BASE STATION APPARATUS, MOBILE STATION APPARATUS, AND COMMUNICATION METHOD

TECHNICAL FIELD

The present invention relates to a technique of performing wireless communication while switching plural kinds of communication method.

BACKGROUND ART

In the conventionally known wireless communication technique, an uplink (also called upstream or upstream link) generally means a link transmitting data from a mobile station apparatus to a base station apparatus when communication is performed between the base station apparatus and the mobile station apparatus in cellular communication or the like. In this uplink, the base station apparatus receives signals from various mobile station apparatuses at the same time. Thereby, when received power is the same among the signals, reception process is easily performed and an excellent reception characteristic is obtained. For realizing this condition, there is introduced a system of controlling a transmitted power of a signal transmitted from the mobile station apparatus, which is called transmit power control (TPC).

The communication method used for a mobile phone of 3G (third generation) is CDMA (Code Division Multiple Access), and the plural mobile station apparatuses use respective codes different form one another and access the base station apparatus using the same frequency, and thereby the TPC is generally required to have a high accuracy and a high speed. Meanwhile, in a standard of the mobile phone for the next generation (3.9G), DFT-S-OFDMA (Discrete Fourier Transform-Spread-Orthogonal Frequency Division Multiple Access) is to be used as an uplink communication method, in which the TPC is not required to have a high accuracy and a high speed as in the TPC used in CDMA but the TPC is specified for the purpose of appropriately controlling interference to a neighboring base station apparatus (Non-patent document 1).

TPC methods are broadly divided into two and called an open loop and a closed loop, respectively. In an brief explanation assuming the use of the TPC in the uplink, the TPC of the open loop is a control method in which the mobile station apparatus controls the transmitted power by judgment of the mobile station apparatus and the TPC of the closed loop is a control method in which the transmitted power is controlled by an instruction from the base station apparatus.

In the open loop, there is a method in which an attenuation amount is estimated by the use of transmitted power transmitted from the base station apparatus and received power actually received by the mobile station apparatus, and transmitted power of the mobile station apparatus is determined from the estimated attenuation amount and received power required by the base station apparatus. Meanwhile, in the closed loop, there are a method in which the base station apparatus measures the received power and notifies a short or over amount thereof and a method in which the base station apparatus notifies increase or decrease of the transmitted power in the mobile station apparatus by the use of an error rate of a transmitted signal or the like.

PRIOR ART DOCUMENT

Non-Patent Document

Non-patent document 1: 3gpp is 36.213 v8. c 5. 0 5.1

DISCLOSURE OF THE INVENTION

Problem to be Solved by the Invention

However, for the generation after next (4G), as an uplink communication method, it is being discussed that plural access methods are switched therebetween to be used. The specifically discussed access methods are DFT-S-OFDMA (also called SC-FDMA) which uses continuous subcarriers, Clustered DFT-S-OFDMA which uses non-continuous sub-carriers, and further OFDMA. Moreover, as a method for switching these access methods therebetween, semi-static switching, that is, a method using the same method for a comparatively long time as far as there is not a large movement of the mobile station apparatus, and dynamic switching, that is, a method of switching the access methods therebetween by a packet unit, are being discussed.

When the access method is changed, required received power becomes different and maximum transmitted power to be transmitted becomes different. If the TPC used in 3.9G is applied to 4G without change, there arises a problem in such a system that the received power required by the base station apparatus cannot be secured and data error is caused at the instant of the switching. Further, there also arises a problem that the mobile station apparatus transmits unnecessarily large power and gives interference to another cell.

The present invention has been achieved in view of such a situation and has an object of providing a wireless communication system, a base station apparatus, a mobile station apparatus, and a communication method, which can operate the TPC appropriately in response to switching timing of the access method to prevent an error from occurring in communication and can reduce influence given to another cell due to the transmission of unnecessary power.

Means for Solving the Problem (1) For achieving the above object, the present invention is configured as follows. That is, a wireless communication system of the present invention, in which a transmission apparatus and a reception apparatus both capable of using plural kinds of communication method perform wireless communication while switching the transmission method, performs transmit power control of the transmission apparatus when the communication method is switched.

In this manner, the transmit power control of the transmission apparatus is performed when the communication method is switched, and thereby it becomes possible to prevent an error from occurring in the communication and also to reduce influence to another cell due to the transmission of unnecessary power.

(2) Further, the wireless communication system of the present invention performs the transmit power control of the transmission apparatus according to communication characteristic change caused when the communication method is switched.

In this manner, the transmit power control of the transmission apparatus is performed according to the communication characteristic change caused when the communication method is switched, and thereby it becomes possible to cause the system to receive little influence of the communication characteristic change between before and after the communication method is switched.

(3) Further, in the wireless communication system of the present invention, the reception apparatus transmits control information for performing the transmit power control of the transmission apparatus to the transmission apparatus when the communication method is switched and the transmission apparatus determines a transmitted power according to the control information.

In this manner, the reception apparatus transmits the control information for performing the transmit power control to the transmission apparatus when the communication method is switched, and thereby it becomes possible to perform the transmit power control in a closed loop method.

(4) Further, in the wireless communication system of the present invention, the transmission apparatus determines the transmitted power according to the control information and information indicating whether the communication method has been switched or not.

In this manner, the transmission apparatus determines the transmitted power according to the control information and the information whether the communication method has been switched or not, and thereby the transmission apparatus can take a different transmit power control value according to the information indicating whether the communication method has been switched or not even when the same control information has been transmitted from the reception apparatus. As a result, new control information needs not be used and it becomes possible to improve throughput.

(5) Further, in the wireless communication system of the present invention, the transmission apparatus determines the transmitted power according to a value specified for each of the transmission apparatuses when the communication method is switched.

In this manner, the transmission apparatus determines the transmitted power according to the value specified for each of the transmission apparatuses when the communication method is switched, and thereby it becomes possible to perform the transmit power control in an open loop method.

(6) Further, in the wireless communication system of the present invention, the plural kinds of communication method are different from one another in an access method.

By this configuration, the transmit power control of the transmission apparatus is performed when the access method is switched, and thereby it becomes possible to prevent an error from occurring in the communication and also to reduce influence given to another cell due to the transmission of unnecessary power.

(7) Further, in the wireless communication system of the present invention, the access method includes at least two of OFDMA (Orthogonal Frequency Division Multiple Access), DFT-S-OFDMA (Discrete Fourier Transform-Spread-Orthogonal Frequency Division Multiple Access), and Clustered DFT-S-OFDMA.

By this configuration, the transmit power control of the transmission apparatus is performed when the access method is switched, and thereby it becomes possible to prevent an error from occurring in the communication and also to reduce the influence to another cell due to the transmission of unnecessary power.

(8) Further, in the wireless communication system of the present invention, the plural kinds of communication method are different from one another depending on whether transmission diversity is used or not or depending on a kind of the transmission diversity.

In this manner, the transmit power control of the transmission apparatus is performed when the use of the transmission diversity or the kind of the diversity is switched, and thereby it is possible to prevent an error from occurring in the communication and also to reduce the influence to another cell due to the transmission of unnecessary power.

(9) Further, in the wireless communication system of the present invention, the plural kinds of communication method are different from one another depending on the number of antennas to be used.

By this configuration, the transmit power control of the transmission apparatus is performed when the number of the transmission antennas is switched, and thereby it is possible to prevent an error from occurring in the communication and also to reduce the influence to another cell due to the transmission of unnecessary power.

(10) Further, a base station apparatus of the present invention, which performs wireless communication with a mobile station apparatus while switching plural kinds of communication method, transmits control information for performing transmit power control of the mobile station apparatus to the mobile station apparatus when switching the communication method is.

By this configuration, the control information for performing the transmit power control of the transmission apparatus is transmitted to the transmission apparatus when the communication method is switched, and thereby it becomes possible to perform the transmit power control in the closed loop method.

(11) Further, a mobile station apparatus of the present invention, which performs wireless communication with a base station apparatus while switching plural kinds of communication method, receives control information for performing transmit power control from the base station apparatus when the communication method is switched and determines a transmitted power according to the control information.

By this configuration, the control information for performing the transmit power control is received from the base station apparatus when the communication method is switched and the transmitted power is determined according to the control information, and thereby it becomes possible to perform the transmit power control in the closed loop method.

(12) Further, a communication method of the present invention, in which a transmission apparatus and a reception apparatus both capable of using plural kinds of communication method perform wireless communication while switching the communication methods, performs transmit power control of the transmission apparatus when the communication method is switched.

In this manner, the transmit power control of the transmission apparatus is performed when the communication method is switched, and thereby it becomes possible to prevent an error from occurring in the communication and also to reduce the influence to another cell due to the transmission of unnecessary power.

Advantage of the Invention

According to the present invention, even when the transmission method including an access method is changed, it is possible to appropriately perform the transmit power control and to prevent throughput degradation of a whole cell. Further, it is possible to minimize the exchange of control information required for the transmit power control.

BEST MODES FOR CARRYING OUT THE INVENTION

While an uplink transmitting data from a mobile station apparatus to a base station apparatus will be described for explaining the present invention, obviously the present embodiment can be applied to a downlink transmitting data from the base station apparatus to the mobile station apparatus. Further, the present embodiment assumes an access method in which terminals access the base station apparatus using respective frequencies different from one another, and assumes that plural subcarriers are grouped into a resource block (hereinafter, called RB) and an access band is determined for each of the groups in the assumed access method. Accordingly, one RB or plural RBs are used in each of the access methods. Further, in first and second embodiments to be explained in the following, it is assumed that the number of transmission antennas to be used is one.

First Embodiment

Figure 1:
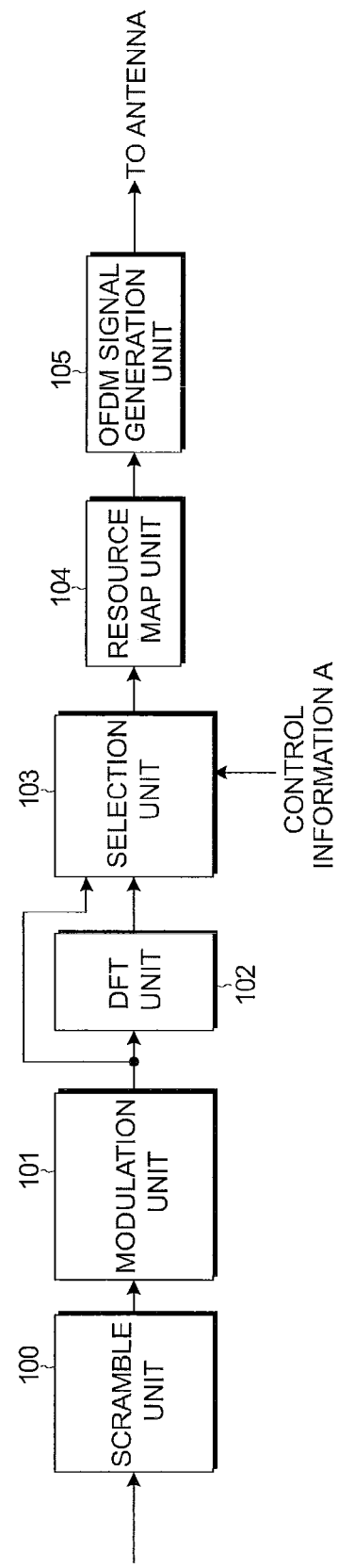
FIG. 1 is a block diagram showing a schematic configuration of a transmission apparatus provided in a mobile station apparatus according to the present embodiment.

Hereinafter, a first embodiment of the present invention will be explained with reference to the drawings. FIG. 1 is a block diagram showing a schematic configuration of a transmission apparatus provided in a mobile station apparatus according to the present embodiment. Note that, for simple explanation, FIG. 1 shows a minimum number of blocks necessary for explaining the present invention. Scramble unit 100 provides scrambling for adding a random property to input data or for adding confidentiality to the data. A modulation unit 101 performs modulation such as QPSK. A DFT unit 102 performs DFT for plural units of data. A selection unit 103 selects an output of the DFT unit 102 or an output of the modulation unit 101 according to control information A. The control information A is determined according to an access method notified by a base station apparatus.

When the selection unit 103 selects a signal output from the modulation unit 101, an OFDM signal generation unit 105 generates an OFDM signal. On the other hand, when a signal output from the DFT unit 102 is selected, the OFDM signal generation unit 105 generates a DFT-S-OFDM signal. A resource map unit 104 allocates data to a RB to be used.

When the RBs to be used are continuous in the resource map unit 104 and the selection unit 103 selects the output of the DFT unit 102, the OFDM signal generation unit 105 generates the DFT-S-OFDM signal. On the other hand, when the RBs to be used are discrete in the resource map unit 104 and the selection unit 103 selects the output of the DFT 102, the OFDM signal generation unit 105 generates a Clustered DFT-S-OFDM signal. Accordingly, in the transmission apparatus shown in FIG. 1, the three access methods, OFDMA, DFT-S-OFDMA, and Clustered DFT-S-OFDMA can be switched therebetween.

Figure 2:
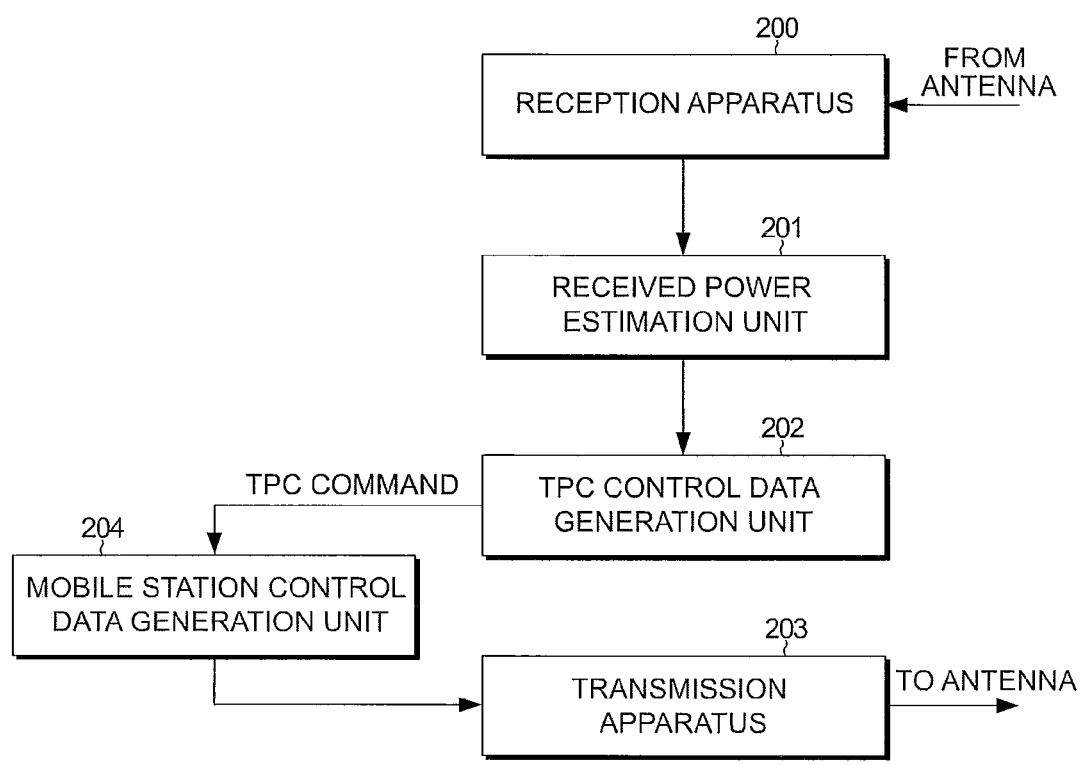
FIG. 2 is a block diagram showing a schematic configuration of a base station apparatus according to the present embodiment.

FIG. 2 is a block diagram showing a schematic configuration of a base station apparatus according to the present embodiment. In FIG. 2, a reception apparatus 200 receives a signal from a mobile station apparatus. A received power estimation unit 201 calculates received power from each of the mobile station apparatuses. A TPC control data generation unit 202 generates data for performing TPC. A transmission apparatus 203 transmits data and control data necessary for the TPC to the mobile station apparatus. A mobile station control data generation unit 204 generates data controlling the mobile station apparatus.

This mobile station control data generation unit 204 determines allocation of the RB, the access method, and the like, other than the TPC control data for each of the mobile station apparatuses, to generate the control data. The TPC control data generation unit 202 generates a TPC command for each of the mobile station apparatuses and notifies the TPC command to the mobile station control data generation unit 204, the mobile station control data generation unit 204 generates data for the TPC control when the TPC command has been notified, and the transmission apparatus 203 notifies the TPC control data to the mobile station apparatus.

Figure 3A:
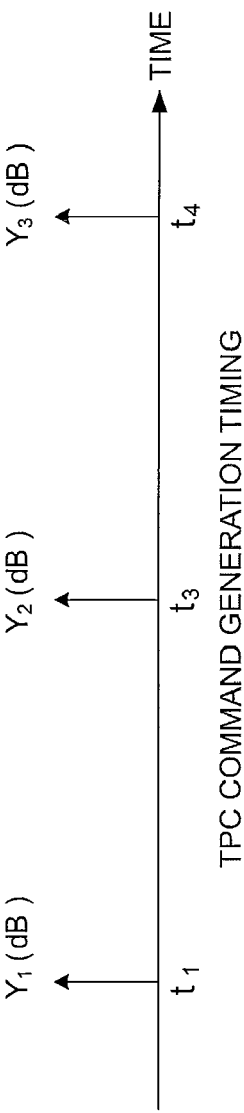
FIG. 3A is a diagram showing TPC command generation timing.
Figure 3B:
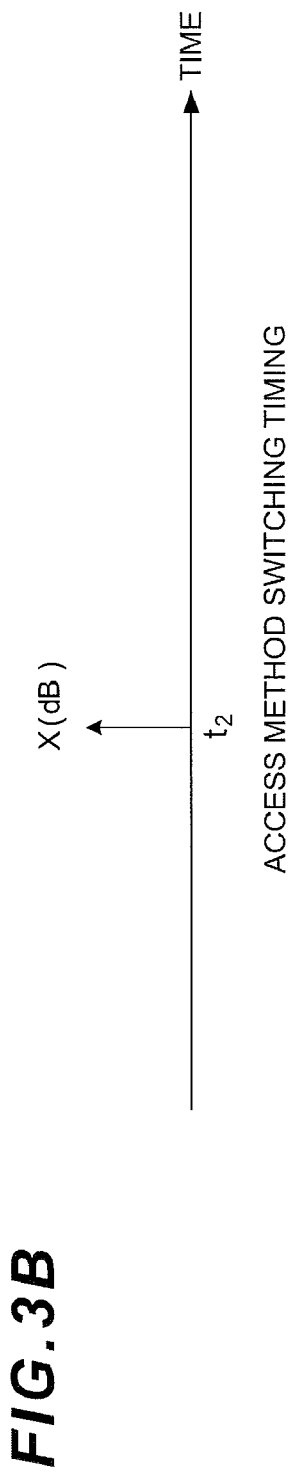
FIG. 3B is a diagram showing access method switching timing.
Figure 3C:
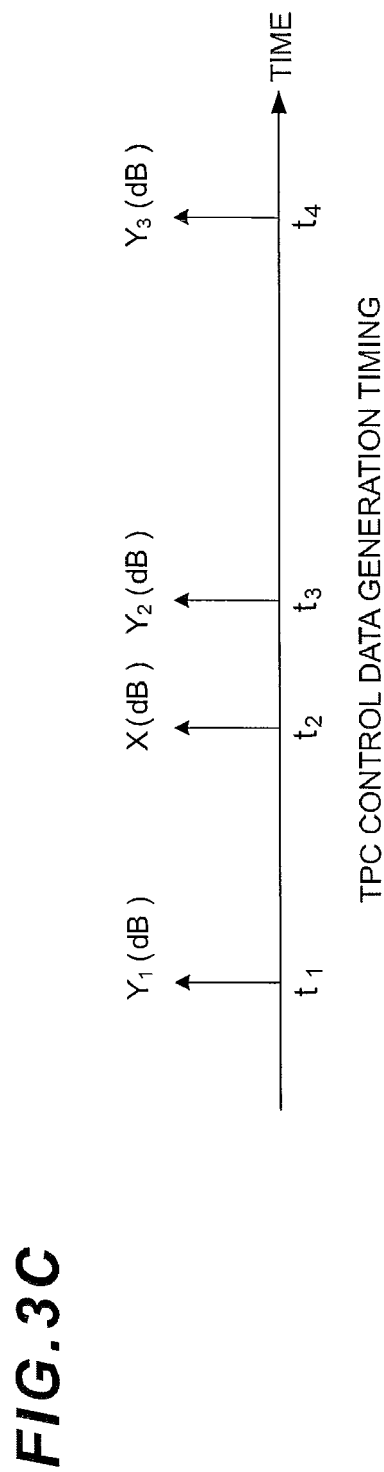
FIG. 3C is a diagram showing TCP control data generation timing.

FIG. 3A is a diagram showing TPC command generation timing. FIG. 3B is a diagram showing access method switching timing, and FIG. 3C is a diagram showing TPC control data generation timing. In FIG. 3A to FIG. 3C, the horizontal axis shows time and the value expressed in dB shows a TPC control amount. The access method switching timing shows timing before and after which the access method to be used is different. A conventional TPC control data generation timing is generated in the same period as the TPC command generation timing. On the other hand, in the present embodiment, the TPC control data is generated in consideration of the access method switching timing.

As far as communication is not affected, the period of the TPC command generation timing is preferably longer. This is because the number of TPC control data transmissions can be reduced when the period is longer and degradation of throughput by the increase of the control data can be prevented. Further, this also because, when excessive response is performed for an instant temporal change in a case such as one in which the TPC control is performed according to received power, characteristic degradation sometimes caused by a shift from the transmission period of the control data.

Next, for an advantage of generating the TPC control data in consideration of the access method switching timing, there will be described an example in which the access method is switched from Clustered DFT-S-OFDMA (called Method 1) to DFT-S-OFDMA (called Method 2). First, respective features of Method 1 and Method 2 will be described. Method 1 and Method 2 are exactly the same in a basic characteristic of the communication method, while different only in whether the RBs to be used are "discontinuous" or "continuous". Note that Method 1 has a possibility of selecting a RB having a higher accuracy since the RBS can be arranged discretely, and Method 1 provides a better reception characteristic when the same mobile apparatus transmits data in the same transmitted power using both of the access methods.

Further, each of Method 1 and Method 2 has a problem that, when frequency-selective fading occurs in a propagation path to be used, ISI (inter-symbol Interference) is caused to degrade the characteristic unless a special reception apparatus is used. In the case of DFT-S-OFDM, when frequency variation is large in the propagation path, the influence of the ISI tends to become large, but Method 1 can suppress the influence of the ISI compared to Method 2 since Method 1 can select a comparatively preferable RB. Note that, while Method 2 is provided with a feature of having a preferable PAPR (Peak to Average Power Ratio) characteristic for a time domain signal, the PAPR characteristic is degraded in Method 1 compared to Method 2. This affects maximum transmitted power in an actual system. That is, when the same transmission apparatus is used, it is possible to increase the maximum transmitted power in method 2 compared to Method 1.

Next, an advantage of the present embodiment will be described. While the above paragraph shows that Method 1 and Method 2 are different from each other in the reception characteristic and Method 1 is superior to Method 2 when communication is performed by the use of the same transmitted power, the difference is defined as X (dB) in the present embodiment. This X (dB) means that Method 2 needs the transmitted power higher than the transmitted power of Method 1 by X (dB) for obtaining the same reception characteristic as the Method 1. Then, unless the TPC is performed at timing when the access method is switched from Method 1 to Method 2, this X dB becomes a degradation of the reception characteristic. That is, this timing is controlled according to the timing shown in FIG. 3C. As described above, the conventional TPC is performed according to the received power or the like, and thereby, when the instant temporal change of the received power is followed, the characteristic is sometimes degraded adversely, but this access method change, when not followed instantly, causes the degradation of the reception characteristic in X (dB) in average.

While this example shows a method of adding the timing of generating the TPC control data also at the access method switching timing in addition to the TPC command generation timing, there is devised a method in which the access method switching timing is made the same as the TPC control data generation timing.

Figure 4A:
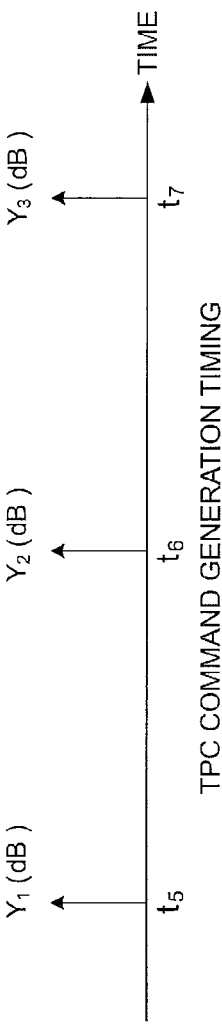
FIG. 4A is a diagram showing TPC command generation timing.
Figure 4B:
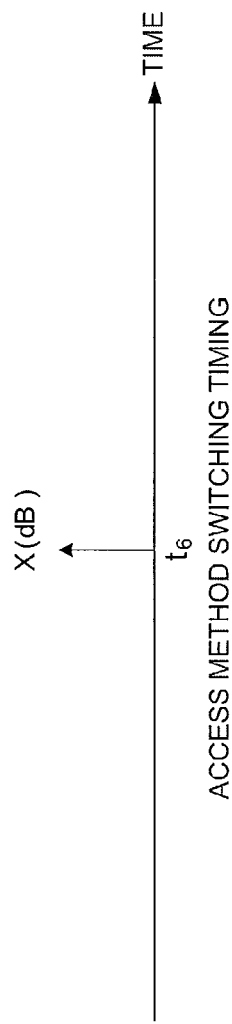
FIG. 4B is a diagram showing access method switching timing.
Figure 4C:
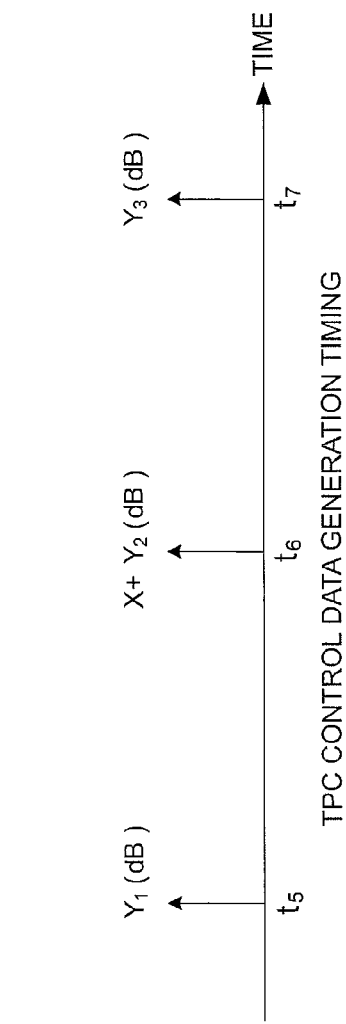
FIG. 4C is a diagram showing TPC control data generation timing.

FIG. 4A is a diagram showing TPC command generation timing, FIG. 4B is a diagram showing access method switching timing, and FIG. 4C is a diagram showing TPC control data generation timing. Note that, in the case shown in FIG. 4A to FIG. 4C, the TPC control data needs to be generated in consideration of X (dB) in addition to a TPC control amount Y(dB) generated at the TPC command generation timing.

While the case in which the access method is switched from Method 1 to Method 2 is described in detail hereinabove, a similar advantage can be obtained for the case in which the access method is switched from OFDMA (called Method 3) to Method 2. This is because the reception characteristic is different between Method 3 and Method 2 when the transmission is performed by the use of the same transmitted power, and, comparing Method 3 and Method 2 to each other, Method 3 has an advantage such as one that the ISI is not caused, in addition to an advantage that the RBs are used discretely and a RB having a high accuracy can be selected. The reception characteristic difference between Method 3 and Method 2 is larger than the reception characteristic difference between Method 1 and Method 2.

Next, the more detailed control will be explained. The TPC includes broadly divided two methods; the TPC by the closed loop which controls the transmitted power according to the control information notified by the base station apparatus as shown in the present embodiment and the TPC by the open loop which the mobile station apparatus estimates an attenuation amount using a distance from the base station apparatus or the like and the mobile station apparatus controls the trans-mitted power. These two methods are used together, and the following formula will be shown as a method of determining the transmitted power.

$$\text{Transmitted power} = \text{Min}\{\text{Maximum transmitted power}, OpTx + ClTx\} \quad (1)$$

In Formula (1), OpTx is transmitted power to be determined in each of the mobile station apparatuses, and ClTx is a transmitted power correction value notified by the base station apparatus. Further, ClTx is provided by plural notification methods, a method notifying a difference from OpTx, a method of accumulating notified ClTx, a method combining these methods, and the like. In Formula (1), Min is a function selecting the minimum value among the values shown in { }.

In Non-patent document 1, when the method of accumulating ClTx is used, two bits are allocated to the TPC control data, four kinds of case, −1, 0, 1, and 3 (dB) can be utilized. Each of these values shows an increase or decrease from a current transmitted power. When the influence of the access method switching is not provided by these values, for example, when a value of −3 dB or 5 dB is required, new data needs to be allocated for the control (three or more bits are allocated for a case currently expressed by two bits). Further, a system using three or more access methods requires further more control data and there arises a case requiring an increased control data amount.

For preventing such increase in the control data amount, if this TPC control amount notified by the base station apparatus is recognized to be a different value at the timing when the switching of the access method occurs, new control information needs not to be prepared. It is shown how to interpret the two bits for the TPC shown in Non-patent document 1, depending on whether the access method switching is notified or not. Here, each of X and Z in the table is a positive number and all the numerical values in the table is expressed in dB.

TABLE 1

| TPC control bit | Without method switching | Method switching (Case of FIGS. 3A to 3C) | Method switching (Case of FIGS. 4A to 4C) |
|---|---|---|---|
| 00 | −1 | −X | −1 ± X |
| 01 | 0 | −Z | ±X |
| 10 | 1 | Z | 1 ± X |
| 11 | 3 | X | 3 ± X |

In this manner, even when the same TPC control information is transmitted from the base station apparatus, the appropriate TPC control can be performed by way of determining whether the access method has been switched or not in the mobile station apparatus and interpreting the TPC control value as a different value. While the method of notifying the control information is most easily devised as a method for notifying the switching of the access method, whether DFT-S-OFDM or Clustered DFT-S-OFDM is determined depending on whether the RB arrangement to be used is discontinuous or continuous and thereby, if the access method is determined depending on "continuity" of the RBs notified by the base station, the control information needs not be newly notified. Note that the modification shown here is an example and various values can be determined when a system specification is determined.

In Non-patent document 1, when ClTx is defined to be a difference from OpTx, two bits are allocated to the TPC control data and four kinds of case, −4, −1, 1, and 4 (dB), can be utilized. These values are control data notified at the same time when the RB is allocated to the mobile station apparatus. It is possible to add the transmitted power difference by the access method switching to this control, and, in this case, interpretation corresponding to Table 1 becomes as shown in Table 2.

TABLE 2

| TPC control bit | Without method switching | Method switching 1 | Method switching 2 |
|---|---|---|---|
| 00 | −4 | −X | −4 ± X |
| 01 | −1 | −Z | −1 ± X |
| 10 | 1 | Z | 1 ± X |
| 11 | 4 | X | 4 ± X |

Further, if it is permitted that the influence to another cell is increased by the delay of the TPC control, there is also devised a method in which the TPC control is performed only when the access method is switched from Method 1 or 3 to Method 2, that is, when the access method is switched from an access method having a preferable reception characteristic to an access method having less-preferable reception characteristic. Further, in the above case, there is also devised a method which uses originally defined TPC control values and uses a maximum shift amount ("11" in Table 1) thereof. In this case, 3 dB is selected for the case of Table 1 and 4 dB is selected for the case of Table 2. "±" in each of the Table 1 and Table 2 needs to be determined by the mobile station apparatus, and "+" is selected when the access method is switched from Method 1 or 3 to Method 2, and "−" is selected in the reverse case.

Second Embodiment

While the first embodiment shows the method of appropriately control the transmitted power by the closed loop when the transmitted power is controlled in response to the switching of the access method, the present embodiment shows a method of controlling the transmitted power by the open loop (in an open loop manner). As shown also in the first embodiment, there is devised a method of generally determining the transmitted power as shown in the following formula as a method of determining the transmitted power.

$$\text{Transmitted power} = \text{Min}\{\text{Maximum transmitted power}, OpTx + ClTx\} \quad (1)$$

In Formula (1), OpTx is transmitted power to be determined in each of the mobile station apparatuses, and ClTx is a transmitted power correction value notified by the base station apparatus. In the present embodiment, the transmitted power is further determined by the following formula in consideration of the switching of the access method.

$$\text{Transmitted power} = \text{Min}\{\text{Maximum transmitted power}, (OpTx + AcOpTx) + ClTx\} \quad (2)$$

AcOpTx is not a value notified by the base station apparatus but a value to be determined by the mobile station apparatus from the specified access method. For example, when the access method is switched from Method 1 (Clustered DFT-S-OFDM) to Method 2 (DFT-S-OFDM), if a reception capability difference is X (dB) as in the first embodiment, AcOpTx is expressed by the following formula.

$$AcOpTx = \pm X/2 \quad (3)$$

For "±", "+" is selected for the switching from Method 1 to Method 2 and "−" is selected in the reverse transition. Further, AcOpTx also can be expressed as follows.

$$AcOpTx = X \text{ (in Method 2)} \quad (4)$$
$$= 0 \text{ (in Method 1)}$$

An advantage over the first embodiment is that it is not necessary to change the control of the base station apparatus and the existing TPC control data and the TPC may be set only by the mobile station apparatus in response to the switching of the access method. The second embodiment also has the same advantage as the first embodiment such as one that the reception characteristic is not degraded by the switching of the access method and the influence to another cell is suppressed. Obviously, the second embodiment can be applied to the switching not only between the Methods 1 and 2 but also between OFDMA (Method 3) and Method 2 as the first embodiment. Further, the case of using more than three methods to be switched can be easily accommodated by means of applying Formula (4).

Third Embodiment

While each of the first and second embodiments shows the case of the access method switching as a case of the communication method switching, the present embodiment shows respective cases in which the number of transmission antennas to be used and a transmission diversity mode are switched. First, the case of switching the number of transmission antennas will be described. Both of the method of the first embodiment which performs the control on the base station apparatus side and the method of the second embodiment which performs the control on the mobile station apparatus side can be applied also to the case in which the number of the transmission antennas is switched, and the present embodiment shows a case in which the control is performed on the mobile station apparatus side as in the second embodiment.

While, in the transmission from the mobile station apparatus side by the use of the plural antennas, there are advantages over to a case of using a single antenna such as an advantage that maximum transmitted power is increased, an advantage that the transmission antenna diversity can be applied, and an advantage that a transmittable area for a base station apparatus is increased, but, on the other hand, there is a disadvantage that power consumption is increased. Accordingly, there is devised a communication method of performing the control of reducing the number of antennas to be used as far as possible and increasing the number of antennas when communication efficiency is degraded. On the basis of such control, the present embodiment first shows a transit power control method according to the increase and decrease in the number of antennas to be used. The number of antennas to be used is assumed to be 1, 2, or 4. This is an example of the number of antennas to be used, for simply explaining the embodiment. The present embodiment is not limited to this number.

There is devised a method of generally determining the transmitted power as shown in the following formula.

$$\text{Transmitted power} = \text{Min}\{\text{Maximum transmitted power}, OpTx + ClTx\} \quad (1)$$

In Formula (1), OpTx is transmitted power to be determined in each of the mobile station apparatuses, and ClTx is a transmitted power correction value notified by the base station apparatus. In the Present embodiment, the transmitted power is further determined by the following formula in consideration of the switching of the number of the antennas to be used.

$$\text{Transmitted power} = \text{Min}\{\text{Maximum transmitted power}, (OpTx + NmOpTx(n)) + ClTx\} \quad (5)$$

NmOpTx is not a value notified by the base station apparatus but a value determined from the number of antennas n used by the mobile station apparatus. Formula (1) is expressed in dB and a control value according to the number of antennas to be used is determined as Formula (6).

$$NmOpTx(n) = -6 \text{(when } n = 4\text{)} \quad (6)$$
$$= -3 \text{(when } n = 2\text{)}$$
$$= 0 \text{(when } n = 1\text{)}$$

Note that, when ClTx is also controlled according to a power reaching the base station apparatus, the correction value notified by the base station apparatus needs to be controlled depending on the number of antennas. By such control, the transmitted power is appropriately controlled without notification from the base station apparatus and without notification to the base station apparatus for the number of transmission antennas to be used.

Further, while data is transmitted from the plural antennas in the same transmitted power in the case of Formula (5), different transmitted power may be used for each of the antennas by way of defining a value such as in Formula (5) for each of the antennas.

While the embodiment has been described so far by assuming that simply the same data is transmitted also when the plural antennas are used, actually, when the plural antennas are used, more efficient communication can be performed by using a transmission diversity technique. "Efficient" means that a gain is obtained by encoding of the transmission signal in addition to the advantage that the transmitted power can be increased. That is, this means that reception capability is better in the case of using the transmission diversity than in the case of simply transmitting the same data when the same power is received. This difference is defined as a transmission diversity gain. Considering this transmission diversity gain, Formula (5) is changed as Formula (7).

$$\text{Transmitted power} = \text{Min}\{\text{Maximum transmitted power}, (OpTx + NmOpTx(n) + TDOpTx(n)) + ClTx\} \quad (7)$$

TDOpTx(n) is not a value notified by the base station but a value determined from the number of transmission antennas n to be used by the mobile station apparatus. When n=1, the diversity cannot be used and NmOpTx=0.

Further, there is devised a case of using plural transmission diversity methods. This is because, since gain or loss is different depending on the transmission diversity, the capability of the whole system can be improved when the different transmission diversities are used depending on a communication environment.

In this case, TDOpTx may be a function depending on the two parameters of the number of antennas n and the transmission diversity method m. That is, Formula (7) is changed as Formula (8).

$$\text{Transmitted power} = \text{Min}\{\text{Maximum transmitted power}, (OpTx + NmOpTx(n) + TDOpTx(n,m))) + ClTx\} \quad (8)$$

Further, while the maximum transmitted power is not changed in the formulae determining the transmitted power in the second and third embodiments, Formulae (2), (7), and (8), this value also needs to be changed. This is because, when the access method is switched to a different one, back-off (value indicating how much lower value from a saturation region of a transmission amplifier can reduce the influence thereof to the signal) presumed for each access method is different. For example, if the back-off is different by Pbl (dB) between DFT-S-OFDM using the continuous RBs and Clustered DFT-S-OFDM using the discontinuous RBs, Formula (2) is changed as the following formula.

$$\text{Transmitted power} = \text{Min}\{\text{Maximum transmitted power} - Pbl \times k, (OpTx + AcOpTx) + ClTx\} \quad (2')$$

Here, k is a parameter depending on the access method, and equal to zero for DFT-S-OFDM and equal to one for Clustered DFT-S-OFDM.

Further, when SFBC (Space Frequency Block Coding) is applied to the DFT-S-OFDM signal as the transmission diversity, the required back-off is different for each of the transmission antennas. When the antenna number is denoted by #n and the back-off amount for each of the antenna is denoted by Pb(#n), Formulas (7) and (8) are changed as the following formulas, respectively.

$$\text{Transmitted power }(\#n) = \text{Min}\{\text{Maximum transmitted power} - Pb(\#n), (OpTx + NmOpTx(n) + TDOpTx(n)) + ClTx\} \quad (7')$$

$$\text{Transmitted power }(\#n) = \text{Min}\{\text{Maximum transmitted power} - Pb(\#n, m), (OpTx + NmOpTx(n) + TDOpTx(n, m)) + ClTx\} \quad (8')$$

Here, the transmitted power is a function of #n and m in Formulae (7') and (8') because the back-off amount is different for each of the antennas and resultantly the transmitted power is different sometimes for each of the antennas.

BRIEF EXPLANATION OF REFERENCE NUMERALS

100 Scramble unit
101 Modulation unit
102 DFT unit
103 Selection unit
104 Resource map unit
105 OFDM signal generation unit
200 Reception apparatus
201 Received power estimation unit
202 TPC control data generation unit
203 Transmission apparatus
204 Mobile station control data generation unit

The invention claimed is:

1. A wireless communication method comprising:
performing communications while switching between a transmission scheme using transmission diversity for encoding a transmission signal and transmitting signals from a plurality of transmission antennas, and a transmission scheme without using the transmission diversity;
determining transmission power using a correction value set by a wireless communication apparatus to transmission power used in performing transmission by the transmission scheme without using the transmission diversity, in performing transmission by the transmission scheme using the transmission diversity; and
determining transmission power from each of the transmission antennas so that the transmission power from each of the transmission antenna is substantially the same.

2. The wireless communication method according to claim 1, wherein in performing transmission by the transmission scheme using the transmission diversity, the transmission power is determined by using a correction value of transmission power notified from a base station apparatus.

3. The wireless communication method according to claim 1, wherein the correction value is a value to correct so that transmission power in performing transmission by the transmission scheme using the transmission diversity is lower than transmission power in performing transmission by the transmission scheme without using the transmission diversity.

4. The wireless communication method according to claim 1, wherein the correction value is a value calculated from gain by the transmission diversity.

5. The wireless communication method according to claim 1, wherein in performing transmission using a plurality of transmission antennas while switching the number of transmission antennas used in transmission, the transmission power of the each of the transmission antennas is determined based on transmission power of the case of performing transmission using a single transmission antenna and a second correction value set by the wireless communication apparatus corresponding to the number of transmission antennas.

6. The wireless communication method according to claim 1, further comprising:
switching among a plurality of transmission diversity schemes to perform transmission; and using a value determined for each of the transmission diversity schemes used in transmission as the correction value.

7. The wireless communication method according to claim 1, wherein maximum values of transmission power determined respectively for the transmission antennas differ from one another.

8. A wireless communication apparatus that has a plurality of transmission antennas to perform communications with a base station apparatus, the wireless communication apparatus comprising:
a communication section configured to perform communications while switching between a transmission scheme using transmission diversity for encoding a transmission signal and transmitting signals from a plurality of transmission antennas, and a transmission scheme without using the transmission diversity;
a determining section configured to determine transmission power using a correction value set, by the wireless communication apparatus, to transmission power used in performing transmission by the transmission scheme without using the transmission diversity, in performing transmission by the transmission scheme using the transmission diversity; wherein
the determining section is configured to determine transmission power from each of the transmission antennas so that the transmission power from each of the transmission antenna is substantially the same.

9. A wireless communication system comprising:
the wireless communication apparatus according to claim 8; and
a base station apparatus that performs communications with the wireless communication apparatus that performs communications while switching between the transmission scheme without using the transmission diversity and the transmission scheme using the transmission diversity.

10. A program of a wireless communication apparatus that has a plurality of transmission antennas to perform communications with a base station apparatus, the program making a computer execute a series of processing of:
performing communications while switching between a transmission scheme using transmission diversity for encoding a transmission signal and transmitting signals from a plurality of transmission antennas, and a transmission scheme without using the transmission diversity;
determining transmission power using a correction value set by the wireless communication apparatus to transmission power used in performing transmission by the transmission scheme without using the transmission diversity, in performing transmission by the transmission scheme using the transmission diversity; and
determining transmission power from each of the transmission antennas so that the transmission power from each of the transmission antenna is substantially the same.

11. An integrated circuit that causes a wireless communication apparatus to exhibit a plurality of functions by being installed in the wireless communication apparatus having a plurality of transmission antennas, the integrated circuit causing the wireless communication apparatus to exhibit a series of functions of:
performing communications while switching between a transmission scheme using transmission diversity for encoding a transmission signal and transmitting signals from a plurality of transmission antennas, and a transmission scheme without using the transmission diversity;
determining transmission power using a correction value set by the wireless communication apparatus to transmission power used in performing transmission by the transmission scheme without using the transmission diversity, in performing transmission by the transmission scheme using the transmission diversity; and
determining transmission power from each of the transmission antennas so that the transmission power from each of the transmission antenna is substantially the same.

12. A base station apparatus that performs communications with a wireless communication apparatus having a plurality of transmission antennas,
wherein the base station apparatus notifies the wireless communication apparatus according to claim 8 of a correction value of transmission power.

13. The wireless communication apparatus according to claim 8, wherein the correction value of transmission power, used by the determining section, is notified from a base station apparatus.

14. The wireless communication apparatus according to claim 8, wherein the correction value is a value to correct so that transmission power in performing transmission by the transmission scheme using the transmission diversity is lower than transmission power in performing transmission by the transmission scheme without using the transmission diversity.

15. The wireless communication apparatus according to claim 8, wherein the correction value is a value calculated from gain by the transmission diversity.

16. The wireless communication apparatus according to claim 8, wherein in performing transmission using the plurality of transmission antennas while switching the number of transmission antennas used in transmission, the determining section determines transmission power of each of the transmission antennas, based on transmission power of the case of performing transmission using a single transmission antenna and a second correction value set by the wireless communication apparatus corresponding to the number of transmission antennas.

17. The wireless communication apparatus according to claim 8, wherein:
the communication section is further configured to switch among a plurality of transmission diversity schemes to perform transmission, wherein
the determining section uses a value determined respectively for each of the transmission diversity schemes used in transmission as the correction value.

18. The wireless communication apparatus according to claim 8, wherein maximum values of transmission power determined respectively for the transmission antennas differ from one another.

* * * * *